United States Patent [19]
Born

[11] Patent Number: 5,515,818
[45] Date of Patent: May 14, 1996

[54] ELECTROMECHANICAL VARIABLE VALVE ACTUATOR

[75] Inventor: Joseph Born, Lincolnwood, Ill.

[73] Assignee: Machine Research Corporation of Chicago, Chicago, Ill.

[21] Appl. No.: 356,053

[22] Filed: Dec. 14, 1994

Related U.S. Application Data

[63] Continuation of Ser. No. 176,835, Dec. 15, 1993, abandoned.

[51] Int. Cl.⁶ ........................................... F01L 9/04
[52] U.S. Cl. .................................. 123/90.11; 251/129.01
[58] Field of Search ..................... 123/90.11; 251/129.01;
310/12, 13, 14, 15; 335/5, 80, 84, 85, 91,
119, 126, 177, 182, 220, 255; 246/225,
249, 250; 139/134; 188/161, 163, 164

[56] References Cited

U.S. PATENT DOCUMENTS

| | | | |
|---|---|---|---|
| 2,572,106 | 10/1951 | Burrell | 123/90.28 |
| 2,767,696 | 10/1956 | Engemann | 123/90.3 |
| 3,439,198 | 4/1969 | Lee | 310/13 |
| 3,505,544 | 4/1970 | Helms | 310/13 |
| 3,666,977 | 5/1972 | Helms et al. | 310/13 |
| 3,853,102 | 12/1974 | Myers et al. | 123/90.11 |
| 3,882,833 | 5/1975 | Longstaff et al. | 123/90.11 |
| 4,145,625 | 3/1979 | Seilly | 310/27 |
| 4,220,878 | 9/1980 | Asano et al. | 310/13 |
| 4,777,915 | 10/1988 | Bonvallet | 123/90.11 |
| 4,794,890 | 1/1989 | Richeson, Jr. | 123/90.11 |
| 4,829,947 | 5/1989 | Leguesne | 123/90.11 |
| 4,831,973 | 5/1989 | Richeson, Jr. | 123/90.11 |
| 4,883,025 | 11/1989 | Richeson, Jr. | 123/90.11 |
| 4,942,851 | 7/1990 | Kawamura | 123/90.11 |
| 4,945,870 | 8/1990 | Richeson | 123/90.11 |
| 4,955,334 | 9/1990 | Kawamura | 123/90.11 |
| 4,984,541 | 1/1991 | Kawamura | 123/90.11 |
| 5,009,202 | 4/1991 | Kawamura | 123/90.11 |
| 5,009,389 | 4/1991 | Kawamura | 123/90.11 |
| 5,069,422 | 12/1991 | Kawamura | 123/90.11 |
| 5,070,826 | 12/1991 | Kawamura | 123/90.11 |
| 5,074,259 | 12/1991 | Pusic | 123/90.11 |
| 5,076,221 | 12/1991 | Kawamura | 123/90.11 |
| 5,080,323 | 1/1992 | Kreuter | 123/90.11 |
| 5,095,856 | 3/1992 | Kawamura | 123/90.11 |
| 5,111,779 | 5/1992 | Kawamura | 123/90.11 |
| 5,115,772 | 5/1992 | Kawamura | 123/90.11 |
| 5,197,428 | 3/1993 | Hornby | 123/90.11 |
| 5,222,714 | 6/1993 | Morinigo et al. | 123/90.11 |

OTHER PUBLICATIONS

"Valve Actuation Controlled by Computer," Society of Automotive Engineers, Inc., vol. 92, No. 5, 1984, pp. 79–81.
Laithwaite and Nasar, "Linear–Motion Electrical Machines," Proceedings of the IEEE, vol. 58, No. 4, Apr., 1970, pp. 531–542.
Dresner and Barkan, "A Review and Classification of Variable Valve Timing Mechanisms," Society of Automotive Engineers, Inc., Paper No. 890674 (1989).
"Electronic Valve Timing," Automotive Engineering, vol. 99, No. 4, Apr., 1991, pp. 19–24.
Dresner and Barkan, "A Review of Variable Valve Timing Benefits and Modes of Operation," Society of Automotive Engineers, Inc., Paper No. 891676 (1989).

Primary Examiner—Weilun Lo
Attorney, Agent, or Firm—Lloyd L. Zickert; Adam H. Masia

[57] ABSTRACT

An electromechanical variable valve actuator for selectively opening and closing an intake or exhaust valve in an internal combustion engine having a valve closure member and a valve seat which employs Lorentz forces by using a current carrying conductive armature coil which is connected to the valve closure member and placed in a fixed air gap and movable in a direction perpendicular to a magnetic field generated by a magnetic field generator and directed across the air gap. The electromagnetic vector force, known as the Lorentz force, exerted on the armature coil results from the cross product of the current and the magnetic field.

43 Claims, 5 Drawing Sheets

ELECTROMECHANICAL VARIABLE VALVE ACTUATOR

This application is a continuation of application Ser. No. 08/176,835, filed Dec. 15, 1993, now abandoned.

This invention relates in general to a valve actuator for an intake or exhaust valve in a cylinder of an internal combustion engine, and more particularly to an electromechanical variable valve actuator for selectively opening and closing an intake or exhaust valve by effecting linear reciprocal movement of the valve's closure member toward and away from a valve seat in the cylinder.

BACKGROUND OF THE INVENTION

Heretofore, it has been common practice to use poppet-type intake and exhaust valves for the cylinders of conventional internal combustion engines to control the passage or flow of gases into and out of the cylinders. These valves are usually spring loaded toward a valve-closed position and are biased open either by a cam and push rod mechanism or by a direct-acting overhead cam mechanism. In either mechanism, the cam shaft is connected to and rotates in synchronization with the engine crankshaft to facilitate the opening and closing of each valve at timed intervals in the engine cycle. Since the valves are linked to the crankshaft, the lift distance is fixed and the lift rate or speed of the closure member of each valve is dependent on and proportional to the engine or crankshaft speed. This restriction, which is well known in the industry, limits engine performance relating to fuel consumption, emissions, torque or output, and idle quality. The overall durability of the engine is also affected because the seating velocity of the valve is dependent on the engine speed.

To eliminate these deficiencies in engine performance and durability, variable valve actuation has been developed to vary the lift distance, lift speed, and seating velocity of the intake and exhaust valve closure members. Variable valve actuation generally enables adjustment of the valve motion profile to meet the ever-changing conditions and demands placed on the engine. Numerous types of variable valve actuator systems have been proposed, some of which are set forth in the 1989 article entitled *A Review and Classification of Variable Valve Timing Mechanisms* by Thomas Dresner and Philip Barkan (Society of Automotive Engineers, Inc. Paper 890674). It is clear from this article and the prior art that tremendous advantages can be obtained by substituting an independent variable valve actuating system for the conventional cam actuated intake and exhaust valve systems.

These advantages generally include conserving fuel, protecting the environment, and increasing engine output and durability. For instance, it is generally agreed that electromechanical variable valve actuation will increase overall valve train efficiency by eliminating the frictional losses of the cam mechanism, the weight of the cam mechanism, and the cam mechanism's consumption or drain of power from the crankshaft. A further advantage of the variable valve actuating system is that the seating velocity of the valve closure member could be reduced to lessen wear on both the valve seat and valve head, thereby increasing the overall life of the valve and the engine. Another benefit of variable valve actuation is the possibility of creating a variable-cycle engine wherein certain valves would remain closed at certain engine speeds to allow the engine to operate as a two-cycle engine at those speeds. Yet another benefit of a variable valve actuating system is that the valve profile could vary to control engine load without use of the throttle, thereby decreasing pumping losses. Variable valve actuation may also enable the engine to be a multi-fuel engine. These advantages increase the engine's efficiency and output while lowering the amount of pollutants emitted.

As explained in the article cited above, different types of variable valve actuator systems have been designed to solve these problems, including substantial work directed toward the use of solenoids and toward the use of magnetic attraction/repulsion principles for opening and closing intake and exhaust valves. These type of systems are exemplified by the following patents: U.S. Pat. Nos. 3,853,102; 3,882,833; 4,762,095; 4,794,890; 4,829,947; 4,831,973; 4,841,923; 4,846,120; 4,942,851; 4,984,541; 5,009,202; 5,009,389; 5,070,826; 5,076,221; and 5,197,428.

While solenoid and magnetic attraction/repulsion valve actuator systems solve some of the problems associated with cam actuated valve systems, a host of additional problems arise in such valve actuator systems. These additional problems have prevented the widespread acceptance and use of these types of variable valve actuators in production internal combustion engines even though it is widely agreed that variable valve actuating systems will dramatically increase engine performance, efficiency, and durability while decreasing pollution.

The solenoid and magnetic attraction/repulsion actuating devices generally employ an iron or ferromagnetic armature which limits the performance of the actuator because it requires a variable air gap to generate force. As the air gap becomes larger when the distance between the moving and stationary magnets or electromagnets increases, there is a reduction in the force applied to the armature. To maintain high forces on the armature as the size of the air gap increases, a higher current is employed in the coils of such devices. This increased current leads to higher energy losses in the system and the possibility of overheating of the coils. The non-constant force profile also makes the precise control of the valve more complex, requiring additional control mechanisms to control the valve closure member's lift distance and lift speed. The result of this is that most current designs have high seating velocities and do not vary the valve lift.

Another problem relating to variable valve actuating devices presently known is that efficiency is hampered by hysteresis losses. Hysteresis losses are caused by the termination or reversal of a magnetic field in iron. These losses are associated with the solenoid actuators of the prior art.

Accordingly, while it is generally agreed that variable valve actuator systems will greatly increase internal combustion engine efficiency, durability, and output, no efficient and inexpensive electromechanical valve actuating system has been generally acceptable for widespread use in production internal combustion engines.

SUMMARY OF THE INVENTION

The present invention overcomes these problems in providing an efficient and inexpensive electromechanical variable valve actuator for opening and closing an intake or exhaust valve in a cylinder of an internal combustion engine which has the ability to vary the lift, seating velocity, dwell and timing. In an internal combustion engine each cylinder includes intake and exhaust openings, each of which is defined by a valve seat. Valve closure members are adapted to open and close the openings by seating and unseating action. Each valve closure member includes a valve stem and a valve head attached to the end of the stem. The electro-mechanical variable valve actuator of the present invention acts on the valve closure member to effect linear reciprocal movement of the valve closure member toward and away from the valve seat, thereby opening and closing the valve.

The variable valve actuator of the present invention employs Lorentz forces by eliminating the iron or ferromagnetic armature used in solenoid and magnetic attraction/repulsion actuators and replacing it with a current-carrying armature coil. The valve actuator includes a magnetic field generator which generates a magnetic field in a magnetically permeable stationary stator or core positioned adjacent to the magnetic field generator to provide low reluctance paths for the magnetic field. The low reluctance paths direct the magnetic field from the magnetic field generator across a fixed air gap. An armature having a current-carrying armature coil is disposed in the air gap for reciprocal movement in the gap to carry an electric current in either direction in perpendicular relation to the direction of the magnetic field to produce a force on the armature coil. The armature is suitably connected to the valve stem such that the valve closure member moves substantially simultaneously with the armature coil. The magnetic field may also be directed to the air gap by a stationary magnetically permeable housing assembly. The housing assembly may additionally function to house the core, the magnetic field generator, the armature, and part of the valve closure member.

The valve actuator of the present invention is activated by a control or power system for selectively causing electric current of a given amperage value to flow through the armature coil in either direction. When a current runs through the armature coil in either direction and perpendicular to the magnetic field, an electromagnetic vector force, known as a Lorentz force, is exerted on the armature coil. The force generated on the armature coil drives the armature coil linearly in the air gap in a direction parallel to the valve stem of the valve closure member. Depending on the direction of the current supplied to the armature coil, the valve closure member will be driven toward an open or closed position. The amount of force generated is found by taking the cross product of the current and the magnetic field. The lift distance, lift speed, seating velocity, and timing of the valve closure member depend on the amount and direction of the force applied to the armature coil which is controlled by the current value supplied to the armature coil.

Accordingly, the electromechanical variable valve actuator of the present invention develops higher and more easily controlled forces than the prior art devices by employing a light-weight armature that does not contain iron or ferromagnetic material. These forces are substantially constant along the distance of travel of the armature because the size of the air gap does not change with the movement of the armature. The fixed air gap reduces the need for large currents, thereby resulting in smaller losses as well as the elimination of the tradeoff between the long stroke and high force present in solenoid actuators. Besides the driving current in the armature, the only current required by the actuator is for sustaining the magnetic field against the loss of magnetism in the core and housing. The combination of the long stroke ability and the high force of the present invention allows the actuator to act directly on the valve stem without the need for a lever assembly and thus reduces mechanical complexity. Similarly, since the actuator of the present invention can produce an equivalent force in either direction at any position, the stroke of the actuator is not fixed.

The present invention further increases efficiency because it eliminates the hysteresis losses associated with the solenoid actuators and reduces the armature mass. No hysteresis loss is associated with the present invention because the armature is not iron or ferromagnetic and because the magnetic field in the core is not required to reverse or terminate during the actuator's operation. Likewise, the decreased mass of the armature means that the energy losses associated with a given seating velocity will be reduced, as well as reducing the wear on those members.

The variable valve actuator of the present invention further increases efficiency of the valve and thus the engine by recapturing lost energy. The recapture of lost energy is made possible by the actuator's ability to produce a force on the armature in either direction, at any position.

The valve actuator of the present invention may also include a compensating or induction coil positioned in the air gap adjacent to the armature coil. The current in the compensating coil will be opposite to that of the armature coil to generate a magnetic field opposite the magnetic field in the armature coil, thereby compensating for the armature coil magnetic field and preventing that field from saturating the core and the housing.

It is therefore an object of the present invention to provide an improved electromechanical variable valve actuator for an intake or exhaust valve in a cylinder of an internal combustion engine which uses Lorentz forces to drive the valve.

Another object of the present invention is to provide an efficient and inexpensive electromechanical variable valve actuator for an intake or exhaust valve in a cylinder of an internal combustion engine which is not mechanically driven by the crankshaft and where the lift rate, seating velocity, and the timing of the valve closure member is not necessarily proportional to the engine or crankshaft speed.

Another object of the present invention is to provide an improved electromechanical variable valve actuator for an intake or exhaust valve in a cylinder of an internal combustion engine which increases valve train efficiency by eliminating the frictional losses of the cam mechanism, the mass of the cam mechanism, and other losses associated with the operation of the cam mechanism.

Another object of the present invention is to provide an improved electromechanical variable valve actuator for an intake or exhaust valve in a cylinder of an internal combustion engine which reduces the seating velocity of the valve closure member to decrease the wear on the valve seats and valve heads, thereby increasing durability of the engine.

Another object of the present invention is to provide an improved electromechanical variable valve actuator for an intake or exhaust valve in a cylinder of an internal combustion engine that increases engine performance by decreasing fuel consumption, decreasing harmful emissions, increasing engine output, increasing idle quality, and compensating for different types of fuel and varying altitudes.

Another object of the present invention is to provide an improved electromechanical variable valve actuator for an intake or exhaust valve in a cylinder of an internal combustion engine which varies the valve profile to control engine load without use of the throttle thereby lowering pumping losses.

Another object of the present invention is to provide an improved electromechanical variable valve actuator for an intake or exhaust valve in a cylinder of an internal combustion engine which enables the engine to act as a variable-cycle engine wherein certain intake and exhaust valves are closed at designated engine speeds to allow the engine to operate as a two-cycle engine.

Another object of the present invention is to provide an improved electromechanical variable valve actuator for an intake or exhaust valve in a cylinder of an internal combustion engine which develops and maintains higher constant forces than the prior art with a lighter armature which is not required to contain iron or ferromagnetic material.

Another object of the present invention is to provide an improved electromechanical variable valve actuator for an intake or exhaust valve in a cylinder of an internal combustion engine in which the size of the air gap does not vary in relation to armature movement thereby eliminating the tradeoff between the long stroke and high force in solenoid and/or iron armature actuators.

Another object of the present invention is to provide an improved electromechanical variable valve actuator for an intake or exhaust valve in a cylinder of an internal combustion engine which enables the actuator to act directly on the valve stem rather than through a lever assembly, thereby reducing mechanical complexity.

Another object of the present invention is to provide an improved electromechanical variable valve actuator for an intake or exhaust valve in a cylinder of an internal combustion engine which can produce an equivalent force in either direction at any position allowing the stroke of the actuator to vary.

Another object of the present invention is to provide an improved electromechanical variable valve actuator for an intake or exhaust valve in a cylinder of an internal combustion engine which increases efficiency by reducing hysteresis losses.

Another object of the present invention is to provide an improved electromechanical variable valve actuator for an intake or exhaust valve in a cylinder of an internal combustion engine in which the fixed air gap uses smaller input currents resulting in smaller losses.

Another object of the present invention is to provide an improved electromechanical variable valve actuator for an intake or exhaust valve in a cylinder of an internal combustion engine which can recapture energy from the movement of the armature.

Other objects, features and advantages of the invention will be apparent from the following detailed disclosure, taken in conjunction with the accompanying sheets of drawings, wherein like reference numerals refer to like parts.

DESCRIPTION OF THE INVENTION

Referring now to FIGS. 1 to 5, the electromechanical variable valve actuator of the present invention, generally indicated by numeral 20, is illustrated in conjunction with an intake or exhaust valve 22 in a cylinder 24 of an internal combustion engine (not shown). Each valve 22 includes an opening 23 in a cylinder 24 defined by a cylindrical valve seat 26. The valve 22 further includes a valve closure member 28 having a cylindrical valve stem 30 and a cylindrical valve head 32 attached to the end of the stem 30 for coacting with the valve seat 26 to open and close the valve 22.

Figure 1:
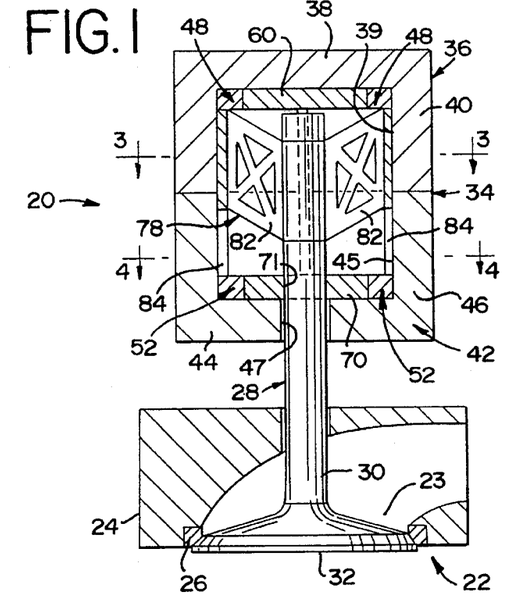
FIG. 1 is a vertical sectional view of the cylindrical electromechanical variable valve actuator of the present invention with some parts shown in elevation.
Figure 2:
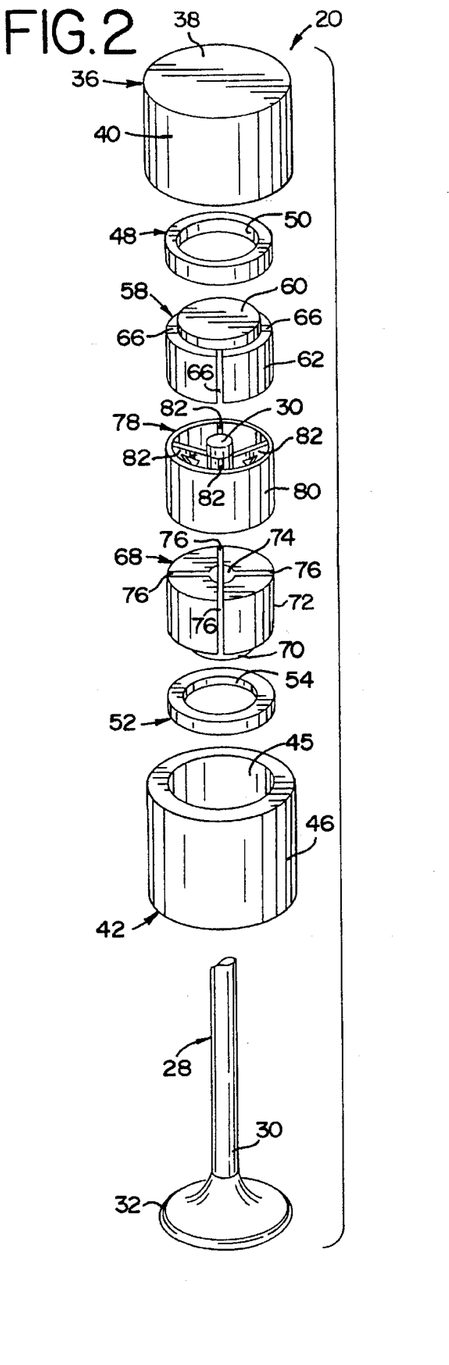
FIG. 2 is an exploded perspective view of the valve actuator of FIG. 1 illustrating the housing assembly, magnetic field generator, core, armature, and valve closure member.
Figure 3:
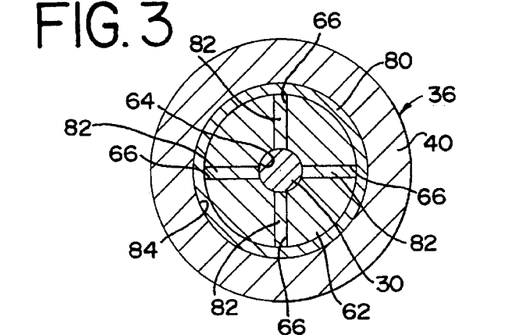
FIG. 3 is a transverse sectional view of the valve actuator of FIG. 1 taken substantially along line 3—3 of FIG. 1.
Figure 4:
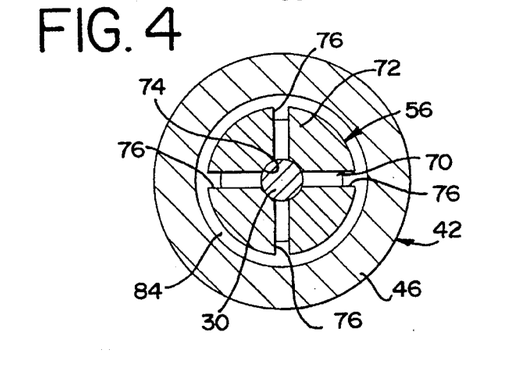
FIG. 4 is a transverse sectional view of the valve actuator of FIG. 1 taken substantially along line 4—4 of FIG. 1.

The valve actuator 20 of the present invention generally includes a housing assembly 34 consisting of upper and lower tubular housing members 36 and 42, a magnetic field generator consisting of upper and lower field coils 48 and 52, a core 56 consisting of upper and lower core member 58 and 68, and an armature 78 suitably connected to the valve stem 30.

Figure 6:
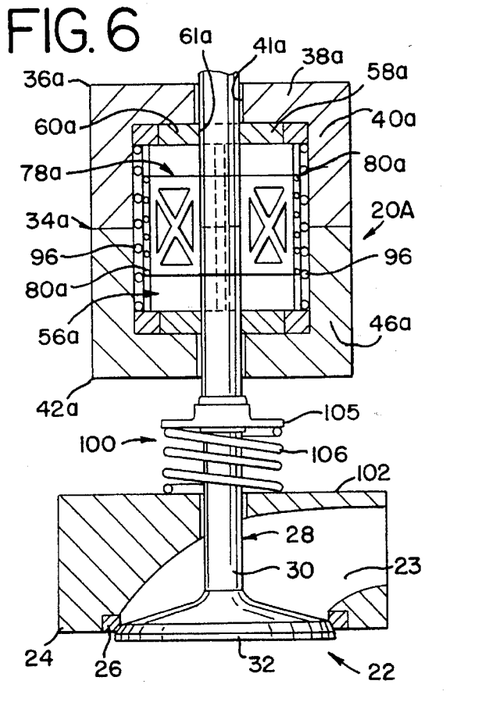
FIG. 6 is a vertical sectional view of a valve actuator like FIG. 1 which further includes a compensating coil and a lower spring assembly, and showing some parts in elevation.
Figure 8:
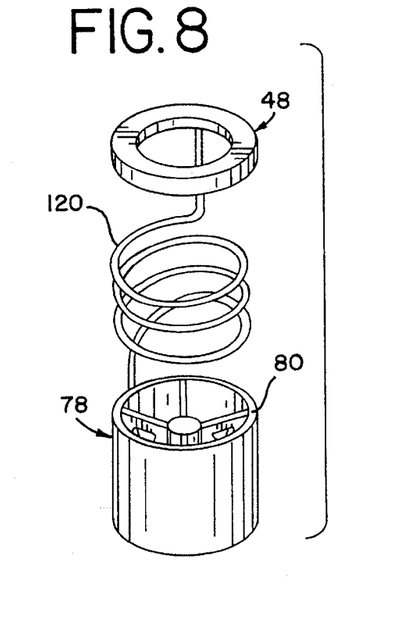
FIG. 8 is a partial exploded perspective view of the upper field coil and the armature of the valve actuator of FIGS. 1 and 6 illustrating a flexible conductor for providing an electrical potential to the armature coil.

The upper and lower tubular housing members 36 and 42 are arranged in end-to-end relation and suitably secured together when the actuator is assembled. The upper and lower housing members 36 and 42 include cylindrical bases 38 and 44 respectively, and tubular walls 40 and 46 integrally extending from the respective bases 38 and 44. The bases and the walls define centrally located cylindrical interior bores or chambers 39 and 45 in the upper and lower housing members 36 and 42. The base 44 of the lower housing member 42 includes a centrally positioned cylindrical valve stem opening 47 through which the valve stem 30 extends. Although not shown in FIGS. 1 and 2, the base 38 of the upper housing member 36 may also include a centrally positioned cylindrical valve stem opening through which the valve stem may extend, as illustrated in FIGS. 6 and 8 and as described below.

The housing assembly is of a magnetically permeable material, and preferably laminated iron which runs in a plane substantially parallel to the valve stem to minimize eddy currents. It should also be appreciated that the housing assembly 34 is divided into the upper and lower members for assembly purposes, although it could be formed in any suitable variety of segments, shapes and sizes.

The magnetic field generator includes the symmetrical ring-shaped upper and lower field coils 48 and 52. The field coils 48 and 52 are respectively received in the interior chambers 39 and 45 of the upper and lower housing members 36 and 42 and are respectively positioned adjacent to the bases 38 and 44. The field coils 48 and 52 are preferably made of copper wire and are connected to and energized by a suitable electrical potential to generate a radial magnetic field, as described below. The ring-shaped field coils 48 and 52 define cylindrical upper and lower openings 50 and 54 which are adapted to receive the core, as described below.

The core 56 consists of symmetrically formed upper and lower core members 58 and 68 which are arranged in end-to-end relation in the chambers of the housing members between the field coils 48 and 52. The upper and lower core members 58 and 68 respectively include cylindrical core bodies 62 and 72 and cylindrical core heads 60 and 70 extending from the core bodies. Each core body is formed having a smaller diameter than the diameter of the interior chamber of each housing member. This enables the core members to be placed in the chambers of the housing members and to be concentrically arranged within the housing members to define a relatively thin uniform annular opening or air gap 84 therebetween. The annular air gap 84 extends between the upper and lower field coils 48 and 52, as illustrated in FIG. 1 and the magnetic flux or field travels across the gap. The core heads 60 and 70, having a smaller diameter than the core bodies, are adapted to snugly fit within the cylindrical openings 50 and 54 of the upper and lower field coils 48 and 52 when the upper and lower core members 58 and 68 are respectively positioned in the chambers of the upper and lower housing members 36 and 42. The core heads and the field coils coact to maintain the core members centrally within the chambers of the housing members, thereby maintaining the constant size of the annular air gap 84.

The core bodies 62 and 72 are divided into four spaced-apart symmetrical sections which respectively define centrally located upper and lower cylindrical valve stem holes 64 and 74 and four upper and four lower arm slots 66 and 76. Each section is attached to its respective core head. The upper and lower arm slots 66 and 76 extend from the valve stem holes 64 and 74 to the annular air gap 84 when the core members are assembled in the housing. Also, when assembled, the upper and lower valve stem holes 64 and 74 are aligned to form a continuous hole or opening and the arm slots 66 and 76 are aligned to form four continuous slots. The continuous valve stem holes 64 and 74 extend from core head 60 of the upper core member 58 to the core head 70 of the lower core member 68.

The lower core head 70 includes a core head valve stem hole or opening 71 through which the valve stem 30 moves. The hole 71 is centrally aligned with the valve stem opening 47. The core head 60 may also include a core head valve stem hole through which an elongated valve stem may move, as illustrated in FIGS. 6 and 8 and as described below.

The core is made from a magnetically permeable material and preferably laminated iron which runs in a plane substantially parallel to the valve stem to minimize eddy currents and is configured to prevent magnetic saturation. The core is divided into the upper and lower core members 58 and 68 for assembly purposes and it should also be appreciated that the core could be formed in any suitable manner.

The armature 78 includes a tubular armature coil 80 and four arms 82 which connect the armature coil 80 to the valve stem 30. The entire armature 78 is assembled on the core 56 between the core heads 60 and 70 such that the armature coil is slidably disposed in the annular air gap 84 over the segments of the core bodies. The four arms 82 are received in the upper and lower arm slots 66 and 76 between the segments of the core bodies, and the valve stem 30 is received in the upper and lower valve stem openings 64 and 74 defined by the segments of the core bodies. The armature coil is thereby disposed substantially parallel to the path of movement of the valve stem.

The armature coil is preferably made from aluminum wire or other highly electrically conductive light-weight material which is highly conductive for its mass. The arms of the armature, as well as the valve stem (valve closure member), are preferably made from a high-strength, non-magnetic light-weight material of sufficient strength to withstand the forces placed on the armature while minimizing the mass of the armature and valve closure member. Minimizing the armature mass is especially important in view of the rapid acceleration forces placed on it in both directions. It is recommended that the arms of the armature and the valve stem are made from non-magnetic material so that they are not subject to undesired magnetic forces. For example, the armature arms could be made from certain types of non-magnetic stainless steel, titanium, or carbon fiber composite materials.

It should also be emphasized that the air gap 84 remains fixed irrespective of the position of the reciprocating armature and thus independent of the position of the valve closure member. The length of the air gap 84 between field coils 48 and 52 is adapted to accommodate the longest stroke required of the actuator. However, the length of the air gap does not limit or fix the stroke of the actuator.

Figure 5:
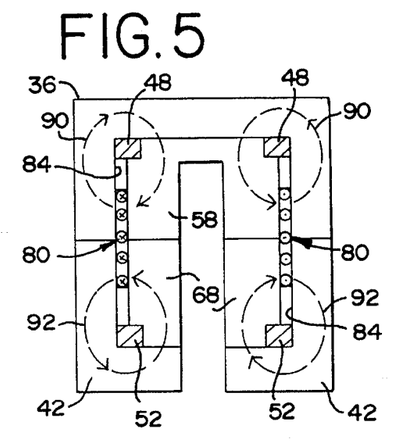
FIG. 5 is a schematic sectional view of the valve actuator of FIG. 1 illustrating the flux path of the magnetic field generated by the magnetic field generator and the direction of the electric current in the armature coil.

The magnetic field produced by the magnetic field generator of the valve actuator 20 is schematically shown in FIG. 5. The magnetic field generator includes field coil 48 which produces a radially directed magnetic field, having flux paths as indicated by the arrowed lines 90, which are directed perpendicular to the annular air gap 84. The flux paths 90 are contained and directed across the air gap 84 by low reluctance paths provided by the magnetically permeable upper housing member 36 and upper core member 58, and are clockwise on the left side because the current direction in the coil is into the paper and counterclockwise on the right side because the current direction is out of the paper. The magnetic field generator also includes the field coil 52 that creates a radially directed magnetic field, having flux paths as indicated by arrowed lines 92, which are directed perpendicular to the annular air gap 84. The flux paths 92 are contained and directed across the air gap 84 by low reluctance paths provided by the magnetically permeable lower housing member 42 and lower core member 68, and are counterclockwise on the left side because the current direction in the coil is out of the paper and clockwise on the right side because the current direction is into the paper. To create a consistent magnetic field in the same direction, the current in the field coils 48 and 52 flow in opposite directions, thereby forcing the magnetic fields to flow radially across the air gap 84. It is preferable that the magnetic field remain practically constant over the entire length of the air gap or length of the armature stroke as defined below.

When a current flows perpendicularly through a magnetic field in a conductor, Lorentz forces are applied to the current carrying conductor. In the present invention, a circumferentially running electric current in the annular armature coil 80 flows perpendicular to the radial magnetic field at all points. Depending on the direction of the current in the armature coil 80, the Lorentz forces thereby exerted on the armature coil 80 causes the armature coil to accelerate toward one of the ends of the air gap. This force is transferred from the armature coil through the armature arms to the valve stem causing the valve closure member to accelerate in the same direction as and simultaneously with the armature coil 80. This armature movement is sometimes labeled the armature stroke.

The direction of the force applied to the armature can be found by using the right-hand rule which requires opening the right hand so that the fingers point in one direction and the thumb points in a direction perpendicular to the direction of the fingers. Then the fingers of the right hand are pointed in the direction of the current with the palm facing the direction of the magnetic field across the armature coil conductors. In that position, the direction of the thumb indicates the direction of the force on the armature or valve stem. For example, applying this rule to the right side cross section of FIG. 5, the current runs out of the page as indicated by the dots or periods in the circles, and the magnetic field created by both field coils 48 and 52 have flux paths directed from left to right across the armature coil and substantially perpendicularly across the air gap 84, resulting in an upward force exerted on the armature coil 80. Likewise, applying this rule to the left side cross section of FIG. 5, the current runs into the page as indicated by the x's in the circles, and the magnetic field created by both field coils 48 and 52 have flux paths directed from right to left across the armature coil and substantially perpendicularly across the air gap 84, resulting in an upward force exerted on the armature coil 80. Since upward force is applied to the armature coil in this example at all points along the cylindrical armature coil disposed in the annular air gap 84, the armature and thus the valve closure member accelerate upwardly in this example.

The amount of force exerted on the armature depends directly on the number of turns in the armature coil, the length of the armature coil in the magnetic field, the strength of the magnetic field, and the value of the electric current which flows through the armature coil. The Lorentz force exerted on the armature is the result of the interaction of the current and the magnetic field. At any point on the wire, the force is equal to the cross product of the current density (J) and the magnetic flux density (B). To find the total force on the armature, the JxB differential elements of force must be integrated over the total volume of the wire. Assuming that the current is perpendicular to the magnetic field and that the magnetic flux density is constant over the length of the wire, the integration of the differential elements of force yields the following relation for total force: F=nIlB, where n is the number of turns of wire in the armature, I is the current in each turn, 1 is the constructive length of each turn, and B is the magnetic flux density. While it is possible to vary either or both the magnetic field and the current in the armature coil to change the amount of force applied to the armature, the magnetic field is preferably maintained at a constant strength, and the force placed on the armature is primarily controlled by changes in the current in the armature coil.

The direction of force applied to the armature can be changed by reversing the direction of current flow in the armature coil. Applying the right-hand rule, when the direction of current is reversed and the magnetic field is constant, the direction of force placed on the armature coil is reversed. Thus, the valve actuator of the present invention has the ability to generate force on or accelerate the armature in both directions. This ability enables the valve actuator 20 of the present invention to effect linear reciprocal movement of the valve closure member along its axis to open and close the valve.

The ability of the valve actuator to generate force in either direction and to vary the amount of force applied to the armature in either direction are important advantages of the present invention. For instance, the speed of the armature in opening and closing the valve can be controlled by varying the value and direction of current directed through the armature coil, and further by varying the flux density in the field coils if desired. Similarly, as the valve head approaches the valve seat to close the valve, the current in the armature coil could be reduced or reversed to slow the valve closure member to reduce the seating velocity, thereby lessening wear on both members as well as reducing the resulting noise caused by contact between the valve closure head and the seat. Varying the time of current flow in the armature further enables the valve actuator to position the valve closure member at any location between the fully open and fully closed position by applying only limited amounts of force in either direction and without additional controls. This provides for variable stroke of the valve closure member.

The ability to reverse the current in the armature coil has the desirable effect of allowing the return of the valve's kinetic energy to the electrical system that would otherwise be lost. This is made possible by the actuator's ability to produce a force on the armature coil in either direction, independent of position. The recapture of lost energy is accomplished by supplying current to the armature coil in a direction such that the force on the armature coil acts to slow the armature coil. In this mode, the armature coil acts like a generator, converting mechanical energy back to electrical energy. Unlike the actuators of the prior art, because the actuator of the present invention can reverse the direction of force as the valve approaches a standing position, it avoids the loss of energy due to the contact of the valve closure member and the valve seat.

The ability to generate force in both directions is also important because it should be remembered that in a standard solenoid there are basically two ways to generate force in two directions. If the armature is an electromagnet, then current in the armature can be reversed such that the armature and stator repel one another. On the other hand, if the armature is just ferromagnetic material, then two separate electro-magnets are needed, one providing force in each direction. The problem with either of these methods is that they suffer from the fact that the amount of force varies with the separation between the electromagnets causing variable air gaps. That means that it is very difficult to control the armature. Thus, extra control equipment must be employed to control the activation of the separate coils. Accordingly, while reversal of the force is theoretically possible in the conventional solenoid actuator, such force varies significantly with air gap separation and in practice has proven extremely difficult to implement.

Referring now to FIG. 6, a modification of valve actuator 20 of the present invention is illustrated. The modified valve actuator, generally indicated by numeral 20A, acts on an intake or exhaust valve 22 which includes a valve closure member 28 having a valve stem 30 and a valve head 32, and a valve seat 26 defining an intake or exhaust opening 23 in a cylinder 24, as explained above. The valve actuator 20A generally includes a housing assembly 34a, a magnetic field generator, a core 56a, and an armature 78a similar to valve actuator 20 except that the upper housing member 36a includes a centrally disposed valve stem opening 41a in its base 38a and the upper core member 58a includes a core head valve stem opening 61a centrally disposed in its core head 60a. The valve stem opening 41a and the core head valve stem opening 61a are centrally aligned and the valve stem 30 is freely received in the openings.

The valve actuator 20A further includes a compensating or induction coil 96 concentric to the armature coil 80a which serves to minimize the inductance of the armature coil and to compensate for the magnetic field generated by the electric current flowing through the armature coil 80a, thereby preventing that field from saturating the housing and core with stray or non-constructive magnetic fields. The compensating coil 96 is a thin conductive coil circumferentially mounted in the chambers of the housing members 36a and 42a on the walls 40a and 46a. The coil is positioned adjacent to the armature coil and runs circumferentially parallel thereto. The compensating coil is not externally connected to a power source; rather, current is induced in the compensating coil by the armature coil. As the current-carrying armature coil linearly reciprocates in the air gap, the changes in the magnetic field around that coil induce an opposing current in the adjacent compensating coil due to the proximity of the two conductive coils. The current which runs in the opposite direction in the compensating coil from the current in the armature coil, generates a magnetic field opposite the magnetic field created by armature coil. The magnetic field of the armature coil and the compensating coil tend to compensate for or cancel each other. This is important because it substantially removes any stray or unconstructive magnetic field or flux from the magnetically permeable core and housing, preventing saturation of the housing and core while leaving substantially only the desired radial magnetic field generated by the field coils contained in the core and the housing.

The compensating coil has an additional function. By reducing the magnetic field generated by the armature coil, the overall inductance of the armature is reduced. Lowering the inductance of the armature coil simplifies control of the actuator because it removes an energy storage element that would cause a lag between the current and voltage that would otherwise need to be considered.

An alternative embodiment (not shown) of the valve actuator of the present invention uses the compensating or induction coil to induce a current in the armature coil and cause a force to accelerate the armature. This embodiment includes a control or power source for selectively energizing the induction coil rather than energizing the armature coil. When the induction coil is energized, current running through the induction coil in either direction induces a current in the armature coil under Faraday's law. According to Faraday's law, an electric current can be induced in a coil by another coil in close proximity which has current running through it. The current induced in the armature coil flows in the opposite direction as the current in the induction coil. The current induced in the armature coil also flows perpendicular with the radial magnetic field generated by the field coils, thereby creating a force on the armature coil. It should be appreciated that this embodiment provides an advantage in that the induction coil is stationary allowing easier connection to a control or power source than needed for the embodiment having a powered moving armature coil which requires a suitable flexible connection between the power source and the armature coil, as described below. It should further be appreciated that the compensating or induction coils could be divided into two or more sections, where each section could be independently energized to induce current in the armature coil depending on the position of the armature coil relative to the induction coil in the air gap. Similarly, every turn in the induction coil does not need to be excited simultaneously. Separate turns in the induction coil could be excited in combination with other turns or alone.

The ability of the valve actuator of the present invention to generate force in both directions and independent of the position of the actuator also enables the actuator to be coupled with a spring assembly in three different configurations, even though the use of springs is not required for the valve actuator of the present invention to function. First, a spring can be disposed such that the valve is biased to the closed position in the absence of actuator force. Secondly, a spring can be disposed such that the valve is biased to the fully open position in the absence of actuator force; and thirdly, springs can be disposed such that the valve is maintained in the midway open position in the absence of actuator force.

The first configuration is illustrated in FIG. 6, wherein the valve actuator 20A includes a lower spring assembly 100 positioned between the housing 34a and the cylinder 24. The spring assembly 100 includes a spring 106 bottomed at one end on the surface 102 of the cylinder head and at the other end on a spring retainer 105 fixed against movement on the valve stem 30 to bias the valve closure member to the closed position in absence of actuator force. It should be appreciated that any suitable spring assembly could be used in connection with the valve actuator of the present invention.

The second configuration, although not illustrated, includes a spring assembly placed above the housing assembly instead of below the housing assembly. When a spring assembly is placed above the housing assembly of the valve actuator, it biases the valve closure member toward a valve open position in the absence of actuator force.

Figure 7:
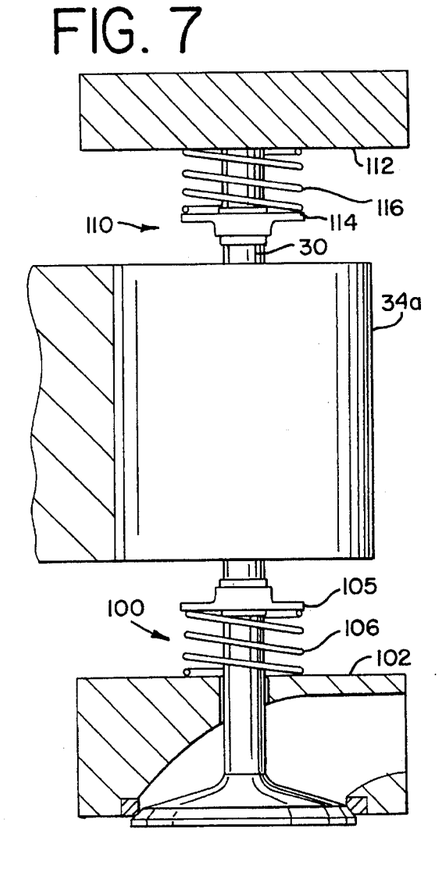
FIG. 7 is a vertical sectional view of a valve actuator like FIG. 6 which further includes an upper spring assembly, and showing some parts in elevation.

The third configuration as illustrated in FIG. 7 shows the valve actuator having lower and upper spring assemblies 100 and 110, respectively. The lower spring assembly 100 is identical to the lower spring assembly illustrated in FIG. 6 for biasing the valve closure member to the closed position. The upper spring assembly 110 includes spring 116 bottomed on one end against the engine block surface 112 and through which the valve stem may move. The spring assembly 110 also includes a cylindrical spring retainer 114 secured to the valve stem 30 above the housing assembly 34a for bottoming the other end of the spring 116 to bias the valve closure member to open. When upper and lower spring assemblies of equal strength are placed above and below the housing of the valve actuator, the spring assemblies maintain the valve in a midway open position in the absence of actuator force. It should be appreciated that the housing assembly 34a, as well as housing assembly 34, is suitably attached to the engine block to prevent its movement relative to the cylinder and valve closure member.

Alternatively, the upper spring assembly may be positioned below the housing such that the spring is bottomed on one end against the bottom surface of the housing and bottomed on the other end against a spring retainer secured to the valve stem to bias the valve closure member to open.

Referring now to FIG. 8, the armature 78 of the valve actuator of the present invention is illustrated with a flexible armature coil electrical connector 120, preferably made from coaxial cable to minimize its magnetic field. The flexible armature coil connector 120 is attached to the armature coil 80 and extends circumferentially in the annular air gap toward the upper field coil 48. The armature coil connector may be inserted inside the cavity of the field coil 48 or outside the field coil 48 and through the upper housing member. The upper housing member 36 includes a passage through which the connector is attached to an exterior control or power source. The flexible connector 120 accordingly provides for the movement of the armature in the air gap. Any other suitable method of electrical connection to the armature coil could be used.

Figures 9, 10, 11:
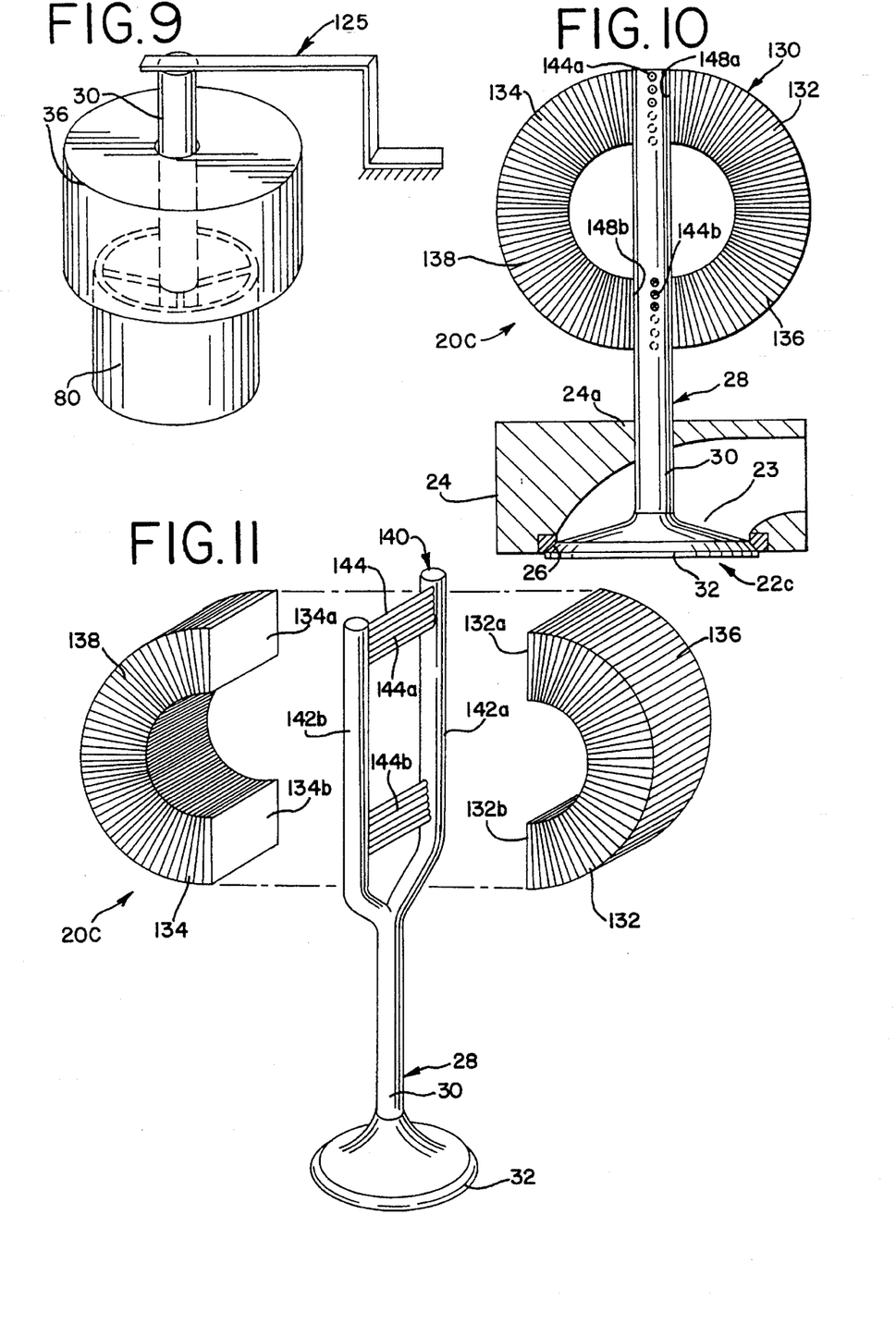
FIG. 9 is a front perspective view of the upper housing member and the armature of the valve actuator of FIG. 6 illustrating a leaf spring conductor for providing an electrical potential to the armature.
FIG. 10 is a vertical sectional view of a further modified embodiment of the valve actuator of the present invention with some parts shown in elevation.
FIG. 11 is an exploded perspective view of the valve actuator of FIG. 10.

Another possible alternative connection for the control or power source for the armature coil 80 of the valve actuator is illustrated in FIG. 9. For this connection the armature and the valve stem should contain a conductive element. The valve stem 30 extends through the upper housing member 36 and engages a conventional flexible contactor 125 suitably connected to a power source. The sliding contactor 125 provides a connection between the control or power source and the armature coil 80 as the valve stem moves up and down.

A further embodiment of the electromechanical variable valve actuator of the present invention, generally indicated by numeral 20C, is illustrated in FIGS. 10 and 11 for acting on an intake or exhaust valve 22c. Like valve 22, valve 22c includes a cylinder 24 having an opening 23 defined by a valve seat 26 in an internal combustion engine (not shown) and a valve closure member 28 including a cylindrical valve stem 30 and a cylindrical valve head 32 attached to the end of the stem and adapted to engage the valve seat 26, thereby opening or closing the valve 22c. The valve actuator 20C generally includes a core 130 having right and left core members 132 and 134, a magnetic field generator having right and left field coils 136 and 138, and an armature 140.

The right and left core members 132 and 134 of the core 130 are substantially C-shaped members aligned in adjacent and opposing relation to each other. The core bodies are positioned such that the ends 132a and 132b of the C-shaped right core member 132 face but are spaced apart from the ends 134a and 134b of the C-shaped left core member 134. These spaced apart core members define upper and lower air gaps 148a and 148b between the ends of the core members and specifically between ends 132a and 134a and between ends 132b and 134b.

Figures 12, 14:
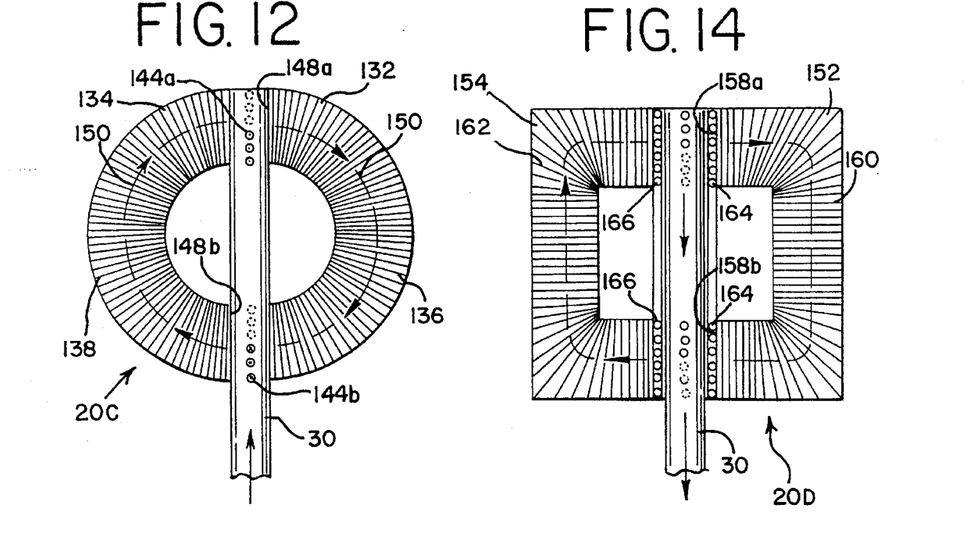
FIG. 12 is a fragmentary vertical sectional view of the valve actuator of FIG. 10 schematically illustrating the direction of the flux path of the magnetic field generated by the magnetic field generator and the direction of the current in the armature coil.
FIG. 14 is a fragmentary vertical sectional view of the modified valve actuator of FIG. 13 schematically illustrating the magnetic field generated by the magnetic field generator, and the direction of current flow in the armature coil and the compensating coils.
Figure 13:
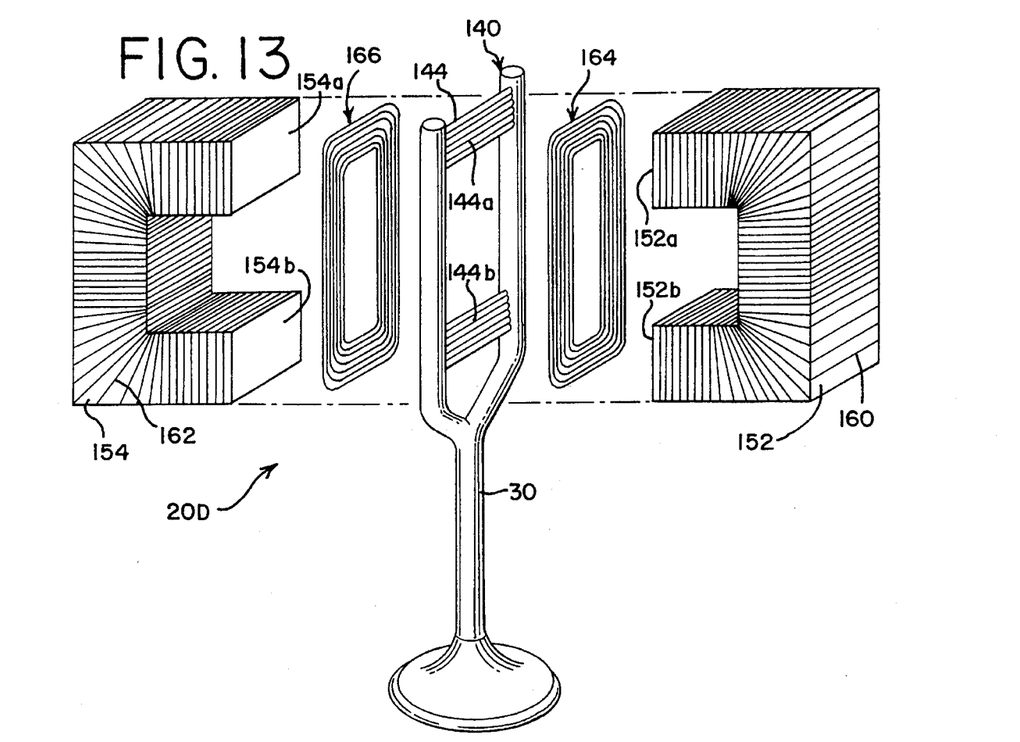
FIG. 13 is an exploded perspective view of a valve actuator like that of FIG. 10 but having a modified core and compensating coils.

The core members are preferably made from a magnetically permeable material and preferably of laminated iron which runs in a plane substantially perpendicular to the armature coil to minimize eddy currents. Although the core is preferably divided into symmetrically formed opposing C-shaped core members, it should be appreciated that the core could be shaped in any suitable manner, as illustrated in FIGS. 13 and 14 and as described below. The core 130 and the valve closure member 28 are supported by a housing which is not shown. In this embodiment the housing does not have a primary function of providing low reluctance paths for the magnetic field in the operation of the valve actuator 20C.

The right and left field coils 136 and 138 of the magnetic field generator are mounted on the right and left core members 132 and 134, respectively. The field coils 136 and 138 are preferably of copper wire wound around the core members and approximately between the ends. The field coil members 136 and 138 may be selectively energized to generate a magnetic field by a control or power source (not shown) which is suitably attached to the field coils. The field coils 136 and 138 generate a magnetic field which is directed across the air gaps 148a and 148b by the low reluctance paths provided by the magnetically permeable core members. Although not preferable, it should be appreciated that only one field coil may be employed in this embodiment because the core will direct the magnetic flux in the same direction whether there are one or more field coils.

The fork shaped armature 140 of the valve actuator 20C is attached to the end of the valve stem 30. The armature includes two spaced-apart tubular arms 142a and 142b which extend from the valve stem 30. The arms 142a and 142b are positioned in the same plane as the valve stem and extend upwardly therefrom. It should be appreciated that the valve closure member and the armature are held in position between the core members by a supporting member 24a attached to the cylinder head.

An armature coil 144 is suitably attached to the tubular arms to form upper and lower active or working coil sections 144a and 144b disposed substantially perpendicular to the path of movement of the valve stem. The nonactive or non-working sections of the armature coil extend vertically inside the tubular arms between the active sections. The armature 140 is centrally positioned in the air gap 148 between the ends of the core members such that the upper and lower armature coil sections 144a and 144b extend substantially parallel between the opposed core members 132 and 134. More specifically, armature coil section 144a extends in the air gap 148a between and parallel to the ends 132a and 134a of the core members 132 and 134 while armature coil section 144b extends in the air gap 148b between and parallel to the ends 132b and 134b of the core members 132 and 134. As best seen in FIG. 10, the valve closure member is positioned in the valve closed position and the armature coil 144 is accordingly located in the uppermost position. The working coil section 144a is positioned at the top of gap 148a and working coil section 144b is positioned at the top of gap 148b. When the armature is activated and the valve closure member is forced to the valve fully open position, the armature coil 144 is accordingly located in the lowermost position, as shown in phantom in FIG. 10. In that position, working coil section 144a is shown in phantom at the bottom of gap 148a and working coil section 144b is positioned at the bottom of gap 148b. Thus, it should be understood that the armature coils 144a and 144b preferably remain in the air gaps 148a and 148b respectively and in the magnetic field crossing those gaps. The length of the gaps is made to accommodate the longest stroke of the valve closure member that would be required, but does not limit or fix the stroke. Partial strokes could be used when desired.

The armature coil is preferably made from aluminum wire or other highly conductive light-weight material similar to armature coil 80. The arms of the armature as well as the valve stem (valve closure member) are preferably made from a non-magnetically permeable light-weight material of sufficient strength to withstand the forces placed on the armature while minimizing the mass of the armature and valve closure member. As explained above, minimizing the armature mass is especially important in view of the rapid acceleration forces placed on those members in both directions. It should be appreciated that the armature could be made from any suitable material such as non-magnetic stainless steel, titanium, or carbon fiber composite materials.

The magnetic field produced by the field coils 136 and 138 of valve actuator 20C is schematically shown in FIG. 12. The field coils 136 and 138 produce a magnetic field having flux paths indicated by arrowed line 150. The magnetic field is contained and directed perpendicularly across the air gaps 148a and 148b by the core members 132 and 134. The current in the field coils 136 and 138 run in opposite directions to generate a combined magnetic field as in valve actuator 20.

When energized, the current flowing in the armature coil sections 144a and 144b runs perpendicular to the magnetic field in the air gaps 148a and 148b. This causes Lorentz forces to be applied to the armature coil which drives the armature coil. This force is transferred through the arms to the valve stem 30 causing the valve closure member to move in the same direction as and substantially simultaneously with the armature coil. It should be appreciated that the armature could also be indirectly linked to the valve closure member.

The direction of the force can be found by using the right-hand rule, as explained above. For example, in FIG. 12, the valve closure member is positioned in the valve open position and the armature coil is accordingly located in the lowermost position. The upper half of FIG. 12 illustrates the armature coil section 144a with the current running out of the page and the magnetic field having flux paths from left to right perpendicularly across the air gap, resulting in an upward force exerted on the armature coil. The bottom half of FIG. 12 illustrates the armature coil section 144b with current running into the page and the magnetic field having flux paths from right to left perpendicularly across the air gap, resulting in an upward force exerted on the armature coil. These forces coact on the armature coil to drive the armature coil toward the positions indicated in phantom.

As in valve actuator 20, the direction of force in valve actuator 20C can be changed by reversing the direction of the current flow in the armature coil. The valve actuator ability to generate force in both directions enables the valve actuator 20C to effect rectilinear movement of the valve closure member along its axis. As with actuator 20, the amount of force exerted on the armature of valve 20C depends directly on the strength of the magnetic field and the value of the current in the armature coil. Again, while it is possible to vary both the magnetic field and the current in the armature coil to change the amount of force applied to the armature, the valve actuator of the present invention preferably controls the force by varying the current while keeping the magnetic field constant.

Referring now to FIGS. 13 and 14, a modified valve actuator 20D, similar to valve actuator 20C, is illustrated with opposing U-shaped opposed core members 152 and 154 instead of the C-shaped members in valve actuator 20C. The core members 152 and 154 are aligned in adjacent and opposing relation to each other and have ends 152a and 152b spaced apart from ends 154a and 154b. The ends define upper and lower air gaps 158a and 158b between the ends of the core members. Opposed field coils 160 and 162, respectively, are positioned on the respective core members similar to valve actuator 20C.

The armature 140 of the valve actuator 20D is identical to the armature of the valve actuator 20C. Armature 140 includes arms 142a and 142b extending from valve stem 30 and an armature coil 144 suitably attached to the arms to form upper and lower working coil sections 144a and 144b. In FIG. 14, the valve closure member is positioned in the valve closed position and the armature coil 144 is accordingly located in the uppermost position. The upper working coil section 144a is positioned at the top of the gap 158a, and the lower working coil section 144b is positioned at the top of the gap 158b.

The modified actuator 20D additionally includes compensating coils 164 and 166 which compensate for the magnetic field generated by current in the armature coil similar to compensating coil 96. The compensating coils 164 and 166 are thin conducting coils vertically and circumferentially mounted to the respective ends of the right and left core members. The coils are positioned adjacent to the armature coil and run parallel thereto. The compensating coils are not externally connected to a power source; rather, the current is induced and/or generated in these coils in the same manner, as explained above. As the armature coil travels upward or downward, it induces an opposing current in the adjacent compensating coils due to the proximity of the conductive coils. Additionally, changes in the value or level of current in the armature induce current in the compensating coils. The currents induced in the compensating coils generate a magnetic field opposite the magnetic field created by armature coil. The magnetic fields of the armature coil and the compensating coil tend to compensate for or cancel each other. This substantially removes any stray magnetic field or flux from the magnetically permeable core members, leaving substantially only the desired or constructive radial magnetic field generated by the field coils in the core.

The compensating coils are preferably made from copper wire but could be made from other conductive materials. It should be appreciated that one or two compensating coils could also be used in the valve actuator 20C having C-shaped core members.

The ability of valve actuator 20C or 20D to generate forces in both directions and independent of the position of the actuator also enables the actuator to be coupled with spring assemblies as described above even though the use of springs is not required to operate the valve actuator of the present invention.

Figure 15:
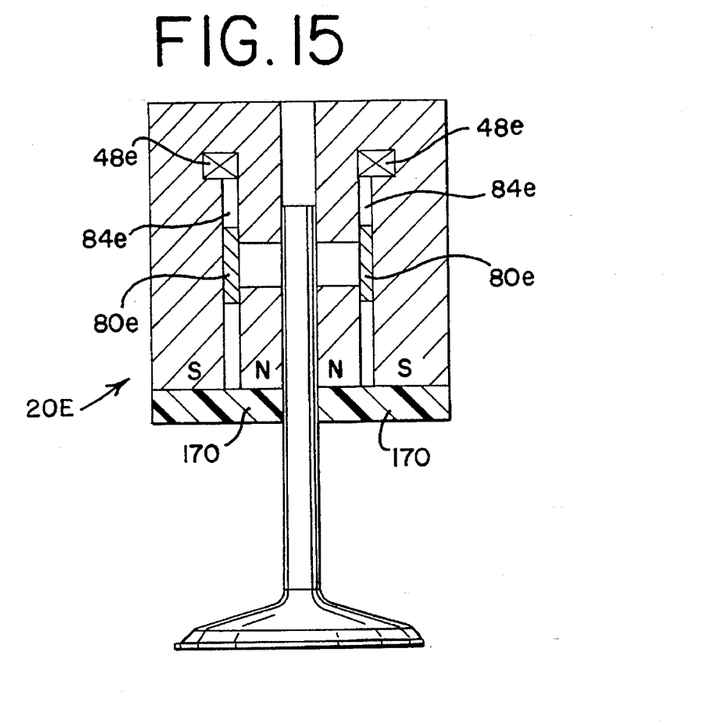
FIG. 15 is a diagrammatic vertical sectional view of another embodiment of the valve actuator of the present invention which includes only one field coil and showing the valve in elevation.

A further modified valve actuator 20E is schematically illustrated in FIG. 15. In this embodiment, the actuator is generally similar to actuator 20 of FIG. 1 except the field generator includes only one field coil 48e to generate the magnetic field across the annular air gap 84e. In this embodiment, there is a certain amount of magnetic flux leakage along a non-magnetic bottom cap 170 and the lower end of the air gap. The bottom cap prevents the armature coil 80e from moving beyond the magnetic field. However, the amount of leakage is minimal because the magnetic flux chooses the path of least reluctance, and the path of least reluctance is the path that minimizes the air gap. Thus, most of the flux crosses directly across the air gap, as in actuator 20.

Figure 16:
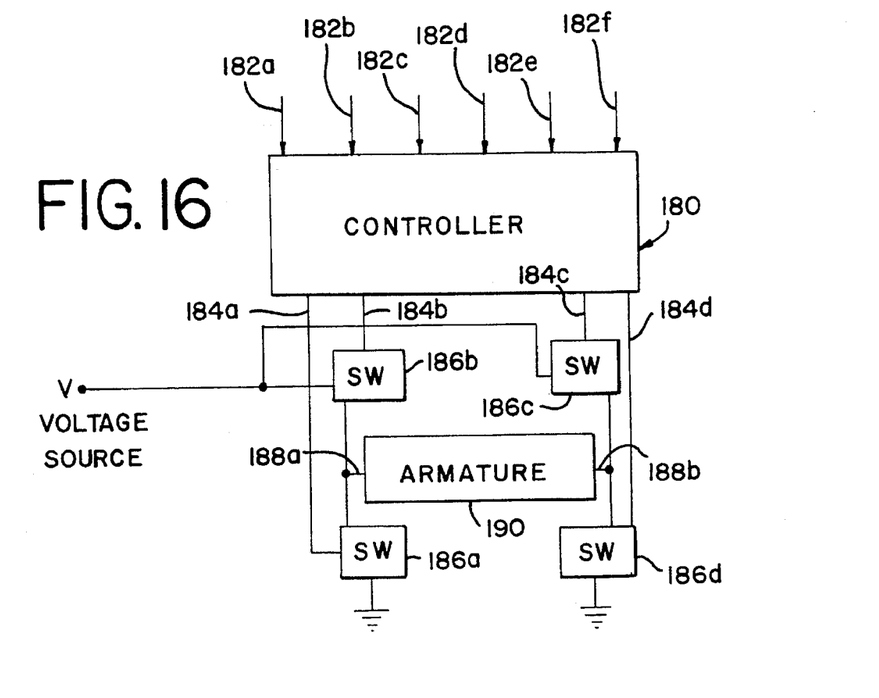
FIG. 16 is a block diagram of a control system for the valve actuator of the present invention.

The valve actuators of the invention may be driven by a controller in the form of a suitable microprocessor in response to various engine load and atmospheric conditions. Referring to FIG. 16, a controller 180 is provided which receives a multiple of input signals along input lines 182a, 182b, 182c, 182d, 182e and 182f, analyzes the inputs in accordance with programmed references, and produces output signals along lines 184a, 184b, 184c and 184d to electronic switches 186a, 186b, 186c and 186d. The switches are connected to the armature 190 by lines 188a and 188b and control the flow and direction of current to the armature. Thus, the operation of the actuator will produce an efficient valve working condition for the engine. The controller could also control the voltage source.

The valve actuators of the present invention may be used in connection with a valve rotator which is well known in the prior art.

It will be understood that modifications and variations may be effected without departing from the scope of the novel concepts of the present invention, but it is understood that this application is to be limited only by the scope of the appended claims.

The invention is hereby claimed as follows:

1. In an internal combustion engine including at least one cylinder and at least one valve seat defining a valve seat opening to the cylinder and at least one of an intake and an exhaust valve closure member, said valve closure member including a valve stem and a head attached to the stem which coacts with the valve seat to open and close the opening, and a valve actuator for driving the valve closure member, said valve actuator comprising: an armature coil connected to said valve stem, a rectilinear air gap within which the armature coil reciprocates, means generating a magnetic field across the air gap, said armature coil including a plurality of windings extending perpendicularly to said air gap, and means for supplying current to said armature coil which coacts with said magnetic field to reciprocally drive the armature coil and valve closure member causing the valve closure member to open and close the valve seat opening depending on the direction of current in said armature coil.

2. The valve actuator of claim 1, wherein the magnetic field generating means includes a plurality of spaced-apart field coils.

3. The valve actuator of claim 1, wherein the magnetic field generating means includes a single field coil.

4. The valve actuator of claim 1, wherein the magnetic field generating means includes magnetically permeable means and field coil means for containing the magnetic field and for directing flow of the magnetic flux across the air gap and perpendicular to the path of movement of the armature coil.

5. The valve actuator of claim 4, wherein the magnetically permeable means includes a core which provides low reluctance paths for the magnetic flux.

6. The valve actuator of claim 5, wherein the magnetically permeable means further includes a housing which provides low reluctance paths for the magnetic flux.

7. In an internal combustion engine, an electromechanical valve actuator for selectively opening and closing at least one of an intake and an exhaust valve having a valve closure member and a valve seat, said valve closure member including a valve stem and a valve head attached thereto which is adapted to engage said valve seat to open and close the at least one valve, said valve actuator comprising:

magnetic field generator means for generating a magnetic field directed substantially perpendicular across a rectilinear air gap, said air gap being substantially parallel to said valve stem;

magnetically permeable means for providing low reluctance paths for said magnetic field;

armature coil means reciprocal in said air gap and disposed in said air gap for directing an electric current through said air gap substantially perpendicular to said magnetic field crossing said air gap;

means connecting said armature coil means to said valve stem;

means for energizing said magnetic field generator means to generate said magnetic field; and means for selectively causing an electric current to flow in said armature coil means, wherein the electric current flow in said armature coil means in either direction flows through said armature coil means substantially perpendicular to said magnetic field generating a physical force on said armature coil means moving said armature coil means in said air gap in a direction substantially parallel to and with said valve stem causing the valve closure member to move toward a closed or an open position depending on the direction and magnitude of the electric current supplied to said armature coil means.

8. The valve actuator of claim 7, wherein said armature coil means includes working coil sections and said electric current flows in said working coil sections in a plane at least partially perpendicular to the path of movement of the valve stem.

9. The valve actuator of claim 7, wherein said electric current flows in said armature coil means in a plane substantially parallel to the path of movement of the valve stem.

10. The valve actuator of claim 7, wherein said magnetically permeable means includes a magnetically permeable core means which provides low reluctance paths for the magnetic flux produced by the magnetic field generator means.

11. The valve actuator of claim 10, wherein said magnetically permeable means further includes a magnetically permeable housing means which also provides low reluctance paths for the magnetic flux produced by the magnetic field generator means.

12. In an internal combustion engine, an electromechanical valve actuator for selectively opening and closing at least one of an intake and an exhaust valve having a valve closure member and a valve seat, said valve closure member including a valve stem and a valve head attached to the stem and which is adapted to engage said valve seat to open and close the at least one valve, said valve actuator comprising:

magnetic field generator means for generating a magnetic field substantially perpendicular to said valve stem;

first magnetically permeable means disposed adjacent to said magnetic field generator means and for providing low reluctance paths for said magnetic field;

second magnetically permeable means for substantially surrounding said magnetic field generator means and said first magnetically permeable means and for providing low reluctance paths for said magnetic field;

said first magnetically permeable means being spaced from said second magnetically permeable means to define an air gap extending substantially parallel to said valve stem, said first and second magnetically permeable means directing said magnetic field substantially perpendicular across said air gap;

an armature coil means movable in said air gap, said armature coil means being disposed for directing a current substantially perpendicular to said magnetic field;

means connecting said armature coil means to said valve stem;

means for energizing said magnetic field generator means to generate said magnetic field; and means for selectively causing an electric current flow in said armature coil means, wherein the electric current flow in said armature coil means in either direction flows through said armature coil means substantially perpendicular to said magnetic field generating a physical force on the armature coil means moving said armature coil means in said air gap substantially parallel to and with said valve stem thereby moving the valve closure member toward a closed or an open position depending on the direction and magnitude of electric current supplied to said armature coil means.

13. The valve actuator of claim 12, wherein said valve stem, said magnetic field generator means, said first magnetically permeable means, said second magnetically permeable means, said air gap, and said armature coil means are substantially cylindrical.

14. The valve actuator of claim 12, wherein said magnetic field generator means includes a field coil member.

15. The valve actuator of claim 12, wherein said magnetic field generator means includes at least two field coil members.

16. The valve actuator of claim 12, wherein said first magnetically permeable means includes a magnetically permeable core.

17. The valve actuator of claim 12, wherein said second magnetically permeable means includes a magnetically permeable housing assembly.

18. The valve actuator of claim 12, wherein said first magnetically permeable means includes at least one valve stem arm slot extending between said air gap and a centrally disposed valve stem aperture, and said connecting means including an arm extending in said slot connecting said armature coil means disposed in said air gap and said valve stem disposed in said valve stem aperture.

19. The valve actuator of claim 18, wherein said first magnetically permeable means includes four valve stem arm slots extending between said air gap and the centrally disposed valve stem aperture, and said connecting means including four valve stem arms extending in said slots connecting said armature coil means and said valve stem which is disposed in said valve stem aperture.

20. The valve actuator of claim 12, which further includes compensating coil means disposed in said air gap parallel to said armature coil means and between said first magnetically permeable means and said second magnetically permeable means and for compensating for the magnetic field generated by said electric current flowing in said armature coil means.

21. The valve actuator of claim 20, wherein said compensating coil means includes a coil disposed adjacent to said armature coil and the second magnetically permeable means.

22. The valve actuator of claim 21, wherein said means for causing electric current flow in said armature coil means includes a means for selectively causing electric current to flow in said compensating coils means in either direction, whereby the electric current flow in said compensating coil means in either direction causes electric current flow in the opposite direction in the armature coil means.

23. The valve actuator of claim 22, wherein the armature coil means is in segments.

24. The valve actuator of claim 12, which further includes a spring assembly means for biasing said valve closure member toward a valve closed position.

25. The valve actuator of claim 12, which further includes a spring assembly means for biasing said valve closure member toward a valve open position.

26. The valve actuator of claim 12, which further includes a first spring assembly means for biasing the valve closure member toward a valve closed position and a second spring means for biasing the valve stem toward a valve open position which coact to position the valve closure member in a position between valve closed and valve open positions.

27. In an internal combustion engine, an electromechanical valve actuator for selectively opening and closing at least one of an intake and an exhaust valve having a valve closure member and a valve seat, said valve closure member including a valve stem and a valve head attached to the stem which is adapted to engage said valve seat to open and close said valve, said at least one valve actuator comprising:

first and second magnetically permeable core means disposed in spaced apart and opposing relation and defining an air gap therebetween and for directing a magnetic field toward said air gap;

magnetic field generator means juxtaposed with at least one of said first or second magnetically permeable core means for generating a magnetic field through said air gap;

armature coil means disposed in said air gap for directing an electric current in said air gap substantially perpendicular to said magnetic field in said air gap;

means connecting said armature coil means to said valve stem;

means for energizing said magnetic field generator means to generate said magnetic field; and means for selectively causing electric current to flow in said armature coil means, wherein said electric flow in said armature coil reacts with said magnetic field of said field coil means, thereby generating a physical force which drives the armature coil and correspondingly the valve closure member toward the open or closed positions depending on the selective activation of the direction of electric current supplied to the armature coil.

28. The valve actuator of claim 27, wherein the core members are substantially C-shaped.

29. The valve actuator of claim 27, wherein the core members are substantially U-shaped.

30. The valve actuator of claim 27, wherein said magnetic field generator means includes a field coil member mounted on one of said first or second magnetically permeable core means.

31. The valve actuator of claim 27, wherein said magnetic field generator means includes at least two field coil members mounted on said first and second magnetically permeable core means.

32. The valve actuator of claim 27, wherein said armature coil means includes a conductive coil.

33. The valve actuator of claim 32, wherein said conductive coil is aluminum.

34. The valve actuator of claim 27, which further includes compensating coil means disposed in said air gap substantially parallel to said armature coil means and between said first and second magnetically permeable core means and for compensating for the magnetic field generated by said current flowing in said armature coil means.

35. The valve actuator of claim 34, wherein said compensating coil means includes two coils, one disposed adjacent to each side of said armature coil and respectively connected to said first and second magnetically permeable core means.

36. The valve actuator of claim 27, wherein said means for causing electric current flow in said armature coil means includes a means for causing electric current to flow in said compensating coil means in either direction, whereby the electric current flow in said compensating coil means in either direction causes electric current flow in the opposite direction in the armature coil means.

37. The valve actuator of claim 36, wherein the armature coil means is in segments.

38. The valve actuator of claim 27, which further includes a spring assembly means for biasing said valve stem toward a valve closed position.

39. The valve actuator of claim 27, which further includes a spring assembly means for biasing said valve stem toward a valve open position.

40. The valve actuator of claim 27, which further includes a first spring assembly means for biasing the valve stem toward a valve closed position and a second spring means for biasing the valve stem toward a valve open position which coact to position the valve stem in a position between valve closed and valve open positions.

41. In an internal combustion engine including at least one cylinder and at least one valve seat defining a valve seat opening to the cylinder and a valve closure member coacting with the valve seat opening, wherein said valve closure member includes a valve stem and a head attached to the stem which coacts with the valve seat to open and close the opening, and a valve actuator for driving the valve closure member, said valve actuator comprising: an armature coil, means drivingly connecting said armature coil to said valve stem, means defining a slot within which the armature coil reciprocates, means generating a magnetic field across the slot, said armature coil including winding means extending substantially perpendicular to said slot, and means for supplying current to said armature coil which coacts with said magnetic field to reciprocally drive the armature coil and valve closure member causing the valve closure member to open and close the valve seat opening depending on the direction of current in said armature coil.

42. In an internal combustion engine, an electromechanical valve actuator for selectively opening and closing at least one of an intake and an exhaust valve having a valve closure member and a valve seat, said valve closure member including a valve stem and a valve head attached thereto which is adapted to engage said valve seat to open and close the at least one valve, said valve actuator comprising:

means defining a rectilinear slot, magnetic field generator means for generating a magnetic field directed across the slot;

magnetically permeable means for providing low reluctance paths for said magnetic field;

armature coil means reciprocal in said slot and disposed in said slot for directing an electric current through said slot substantially perpendicular to said magnetic field crossing said slot;

means drivingly connecting said armature coil means to said valve stem;

means for energizing said magnetic field generator means to generate said magnetic field; and means for selectively causing an electric current to flow in said armature coil means, wherein the electric current flow in said armature coil means in either direction flows through said armature coil means substantially perpendicular to said magnetic field for generating a physical force on said armature coil means and moving said armature coil means in said slot with said valve stem thereby causing the valve closure member to move toward a closed or an open position depending on the direction and magnitude of the electric current supplied to said armature coil means.

43. In an internal combustion engine, an electromechanical valve actuator for selectively opening and closing at least one of an intake and an exhaust valve having a valve closure member and a valve seat, said valve closure member including a valve stem and a valve head attached to the stem and which is adapted to engage said valve seat to open and close the at least one valve, said valve actuator comprising:

magnetic field generator means for generating a magnetic field;

first magnetically permeable means disposed adjacent to said magnetic field generator means and for providing low reluctance paths for said magnetic field;

second magnetically permeable means for substantially surrounding said magnetic field generator means and said first magnetically permeable means and for providing low reluctance paths for said magnetic field;

said first magnetically permeable means being spaced from said second magnetically permeable means to define a slot, said first and second magnetically permeable means directing said magnetic field across said slot;

an armature coil means movable in said slot, said armature coil means being disposed for directing a current substantially perpendicular to said magnetic field;

means drivingly connecting said armature coil means to said valve stem;

means for energizing said magnetic field generator means to generate said magnetic field; and means for selectively causing an electric current flow in said armature coil means, wherein the electric current flow in said armature coil means in either direction flows through said armature coil means substantially perpendicular to said magnetic field for generating a physical force on the armature coil means and moving said armature coil means in said slot with said valve stem thereby moving the valve closure member toward a closed or an open position depending on the direction and magnitude of electric current supplied to said armature coil means.

* * * * *

UNITED STATES PATENT AND TRADEMARK OFFICE
CERTIFICATE OF CORRECTION

PATENT NO. : 5,515,818
DATED     : May 14, 1996
INVENTOR(S) : Joseph Born

It is certified that error appears in the above-identified patent and that said Letters Patent is hereby corrected as shown below:

Col. 9, line 7, change "flow" to --flows--;

Col. 20, line 10, change the line to read:
    --at least one valve, said valve actuator comprising:--

Signed and Sealed this

Thirteenth Day of August, 1996

Attest:

BRUCE LEHMAN

Attesting Officer     Commissioner of Patents and Trademarks